(12) United States Patent
Wallman

(10) Patent No.: US 9,548,524 B1
(45) Date of Patent: Jan. 17, 2017

(54) ANTENNA MOUNT

(71) Applicant: Kenneth Wallman, Los Angeles, CA (US)

(72) Inventor: Kenneth Wallman, Los Angeles, CA (US)

( * ) Notice: Subject to any disclaimer, the term of this patent is extended or adjusted under 35 U.S.C. 154(b) by 0 days.

(21) Appl. No.: 14/838,823

(22) Filed: Aug. 28, 2015

(51) Int. Cl.
*A47G 29/02* (2006.01)
*H01Q 1/12* (2006.01)
*F16C 11/04* (2006.01)

(52) U.S. Cl.
CPC ............ *H01Q 1/1207* (2013.01); *F16C 11/04* (2013.01); *H01Q 1/1221* (2013.01)

(58) Field of Classification Search
CPC ............. H01Q 1/12; H01Q 3/02; F16C 11/04
See application file for complete search history.

(56) References Cited

U.S. PATENT DOCUMENTS

| | | | | |
|---|---|---|---|---|
| 5,647,567 A | * | 7/1997 | Pugh, Jr. ............... | H01Q 1/125 248/237 |
| 7,456,802 B1 | * | 11/2008 | Bourgeois ............ | H01Q 1/1221 343/878 |
| 7,683,853 B2 | * | 3/2010 | Michaelis ............... | H01Q 3/08 343/878 |
| 8,907,862 B2 | * | 12/2014 | Lettkeman ............ | H01Q 1/125 343/878 |

* cited by examiner

*Primary Examiner* — Amy Sterling
(74) *Attorney, Agent, or Firm* — Norton R. Townsley; Belasco Jacobs & Townsley, LLP

(57) ABSTRACT

An antenna mount comprising: a building attachment section including an accessible end; and an antenna support section including a free end and a second accessible end. The accessible end and the second accessible are attached to each other by a joint. The free end is designed so that the antenna can be attached to it. The invention is designed so that the free end is vertical and the antenna is situated far away enough from the building so that it will clear the building when rotated 360°.

5 Claims, 14 Drawing Sheets

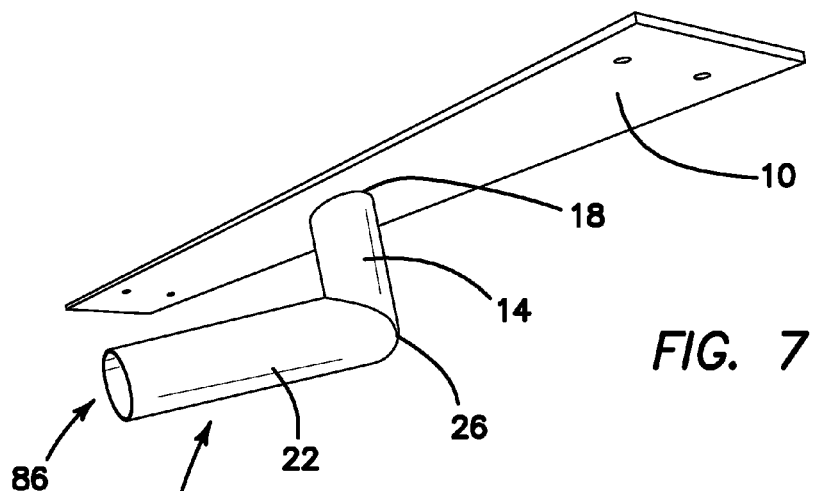
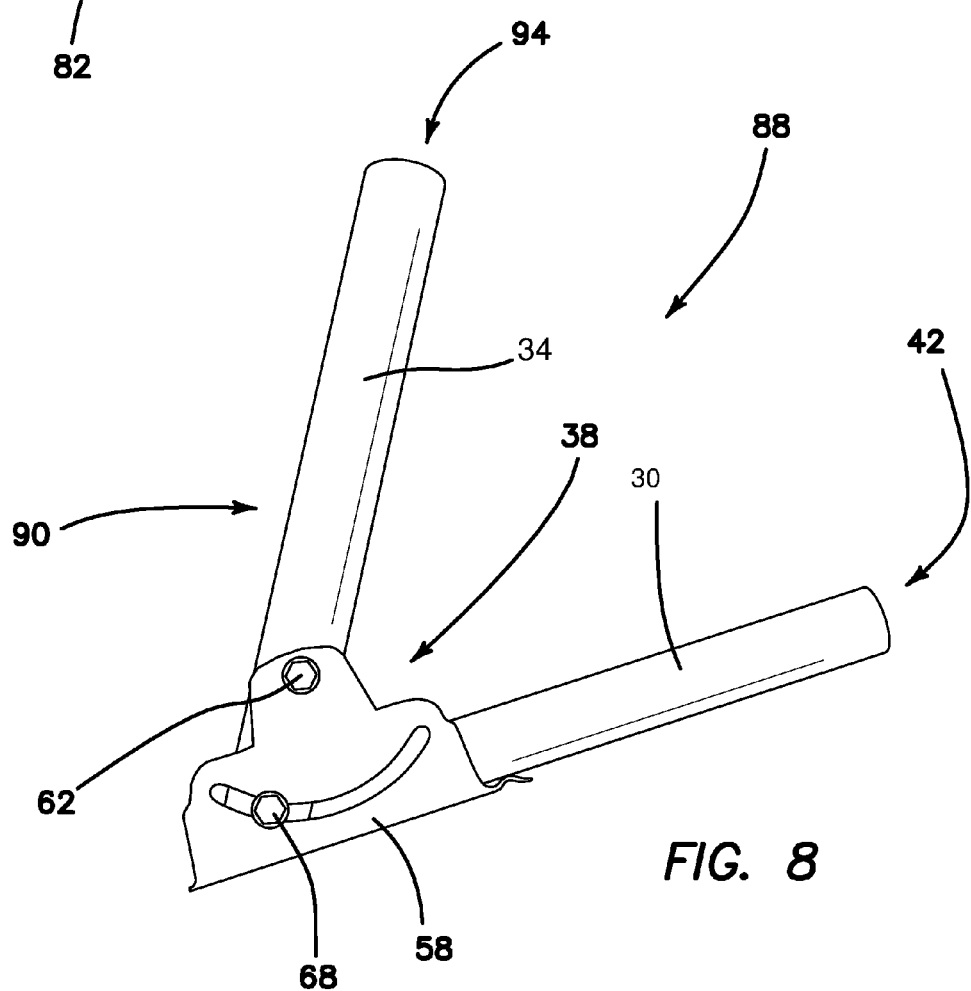

ANTENNA MOUNT

BACKGROUND OF THE INVENTION (1) Field of the Invention

The present invention relates to the field of building construction and more particularly to the field of mounting antennas on buildings.

(2) Description of the Related Art

We are used to seeing radio and TV antennas on buildings throughout the world. We used to see Yagi, log-periodic, loop and similar antennas. With the advent of HDTV and satellite television, we are now seeing dish antennas. They all look fairly ugly and detract from the beauty of the building design. This is particularly true in residential housing areas. In such areas, each individual homeowner is free to select his own TV service provider. If service using an antenna is selected by the homeowner, a technician installs the antenna where he determines the best signal can be received. It may be the roof or a wall. Each service has a preferred antenna design and support structure. Examples are shown on FIGS. 1-6. Eventually, each house in an area has different antennas, sprouting at different locations and angles on each house, which renders the area less beautiful.

What is needed is an identical antenna mounting system for each house in a neighborhood. One way to force uniformity would be for a builder to preinstall a mount on the building.

Development of an antenna mount which can be preinstalled on a building, yet provide sufficient flexibility for the owner's needs represents a great improvement in the field of building construction and satisfies a long felt need of owners and builders.

SUMMARY OF THE INVENTION

The present invention is an antenna mount comprising a building attachment section and an antenna support section. The building attachment section is designed to be attached under roof rafter or to the studs of an exterior wall and has a free end. The antenna support section has two free ends, one of which is designed so that the antenna can attach to it via its clamp. The other free end is attached to the free end of the antenna support section by a joint which may be permanent (such as welded), or rigid and removable or designed in such a way as to permit angular and/or rotational motion. Preferably the joint is designed to permit angular motion. The building attachment section, the support section and the joint are designed so that the antenna is vertical and free to rotate 360°, when it is placed on the one free end of the antenna support section.

The preferred embodiment of this antenna mount comprises a base plate designed to be attached under roof rafters or to studs of an exterior wall and four legs, each having two ends. The first leg is attached to the base plate at one end by a first attachment. One end of the second leg is attached to the other, free end of the first leg by a second attachment. One end of the third leg is attached to the other, free end of second leg by a third attachment. One end of the fourth leg is attached to the other, free end of third leg by a fourth attachment. The other, free end of the fourth leg is designed so that the mounting clamp of the antenna can attach to it. The lengths of legs and their angles of attachments are designed so that the free end of the fourth leg is vertical and the antenna is free to rotate 360°, when placed on this free end but not yet clamped in place. The attachments may be rigid or designed in such a way as to permit angular and/or rotational motion Preferably, the third attachment is designed to permit angular rotation while the other attachments are rigid and attach the legs to each other at predetermined angles. Of course the legs may also be designed so that their lengths can be adjusted.

Preferably, an antenna is mounted to a building by attaching the building attachment section under roof rafters or to studs of an exterior wall, attaching the free end of the building attachment section to the free end of the antenna mounting section with the joint. In this way, this invention may be attached under stucco so that it is unobtrusive. Another advantage is that, by pre-installing the building attachment section to each building before sale, a developer can ensure that all houses in the tract have the same appearance so that the aesthetics of the development may be preserved.

An appreciation of the other aims and objectives of the present invention and an understanding of it may be achieved by referring to the accompanying drawings and description of a preferred embodiment.

BRIEF DESCRIPTION OF THE DRAWINGS

FIG. 7 is a perspective view of the building attachment section of the instant invention, which comprises a base plate, a first leg and a second leg, attached to each other.

FIG. 8 is a perspective view of antenna support section of the instant invention, which comprises a third leg and a fourth leg attached to each other with an angularly adjustable attachment.

DETAILED DESCRIPTION OF THE PREFERRED EMBODIMENT

Figure 1:
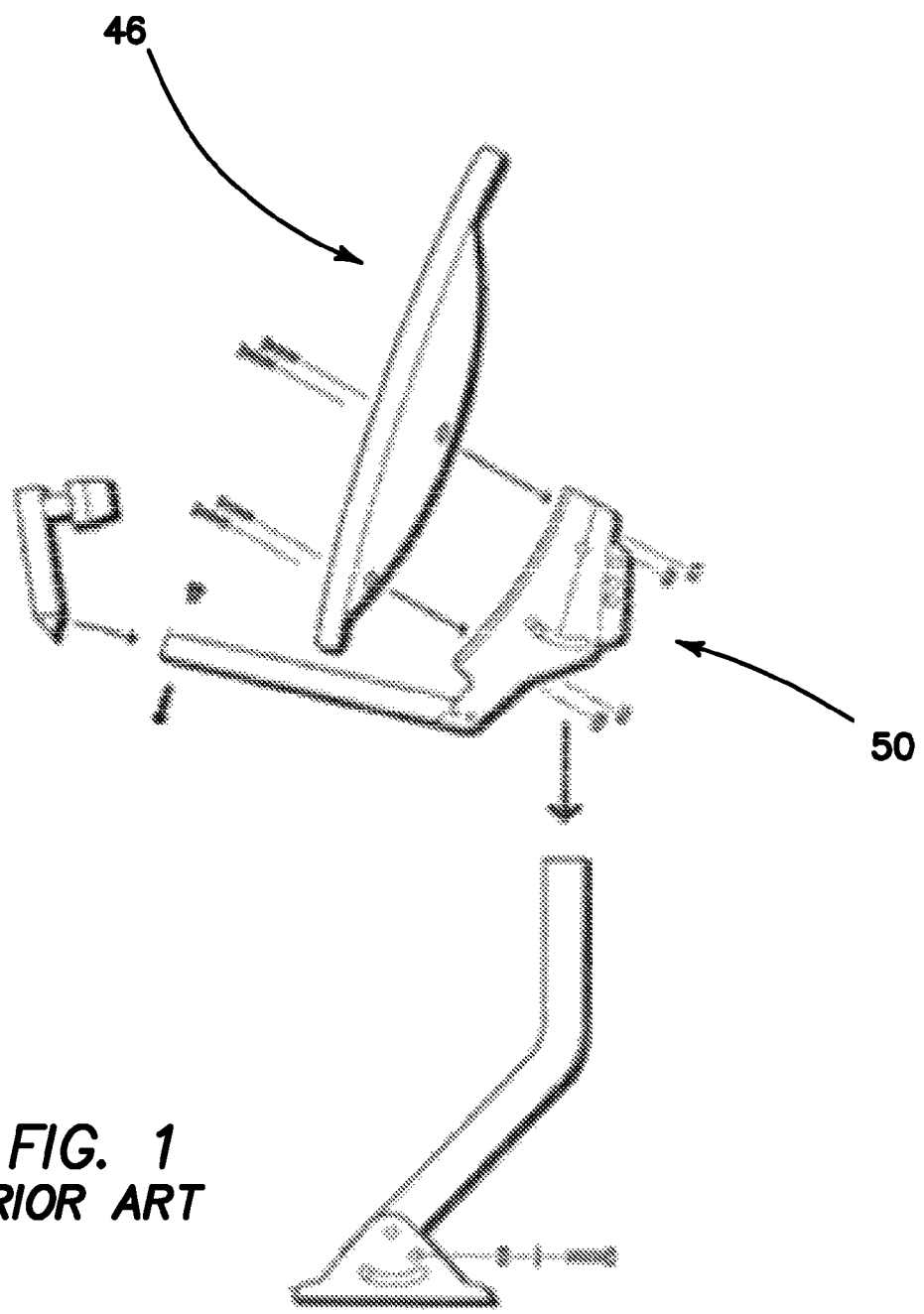
FIG. 1 is a side, exploded illustration of a first, prior art antenna mount and antenna.
Figure 2:
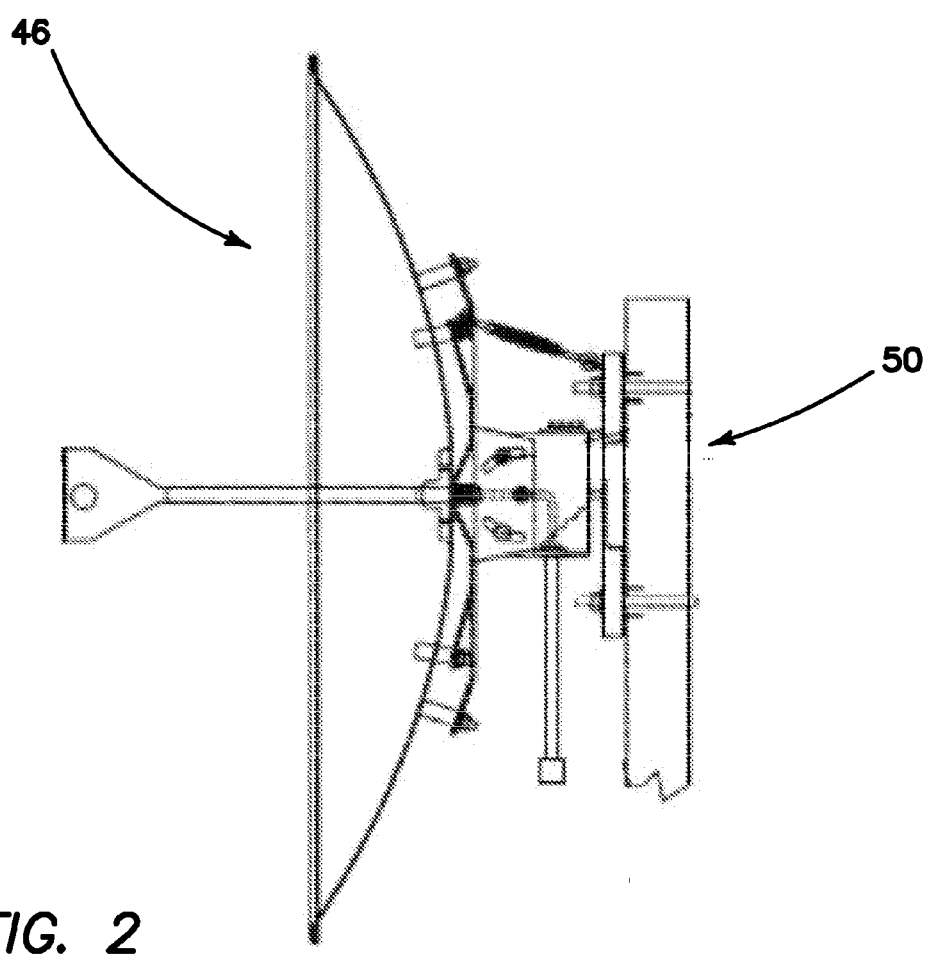
FIG. 2 is a side illustration of a second, prior antenna mount and antenna.
Figure 3:
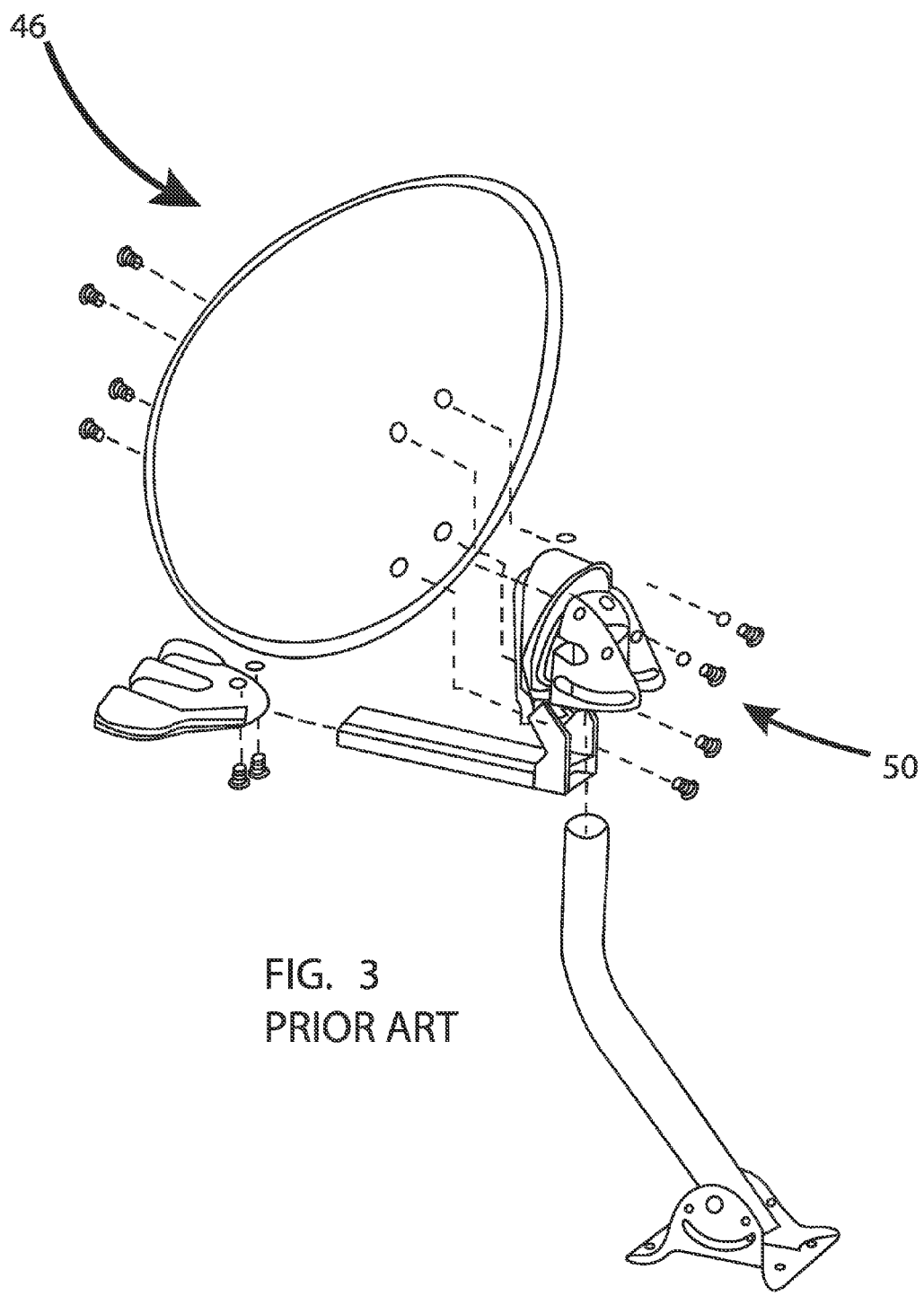
FIG. 3 an exploded, perspective illustration of the first prior art antenna mount with a different antenna.
Figure 4:
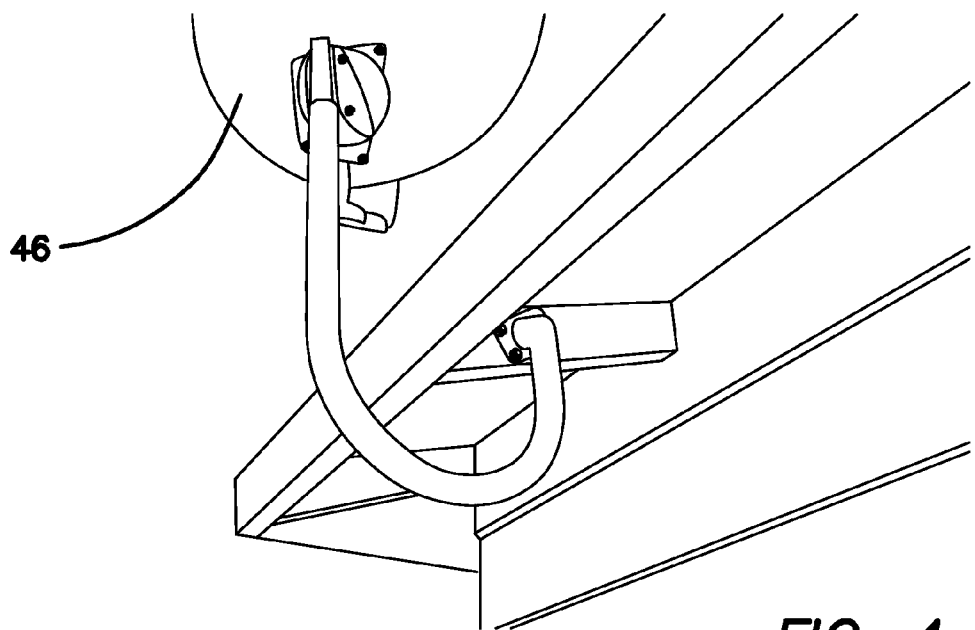
FIG. 4 is an illustration of a third, prior art antenna mount as installed with an antenna.
Figure 5:
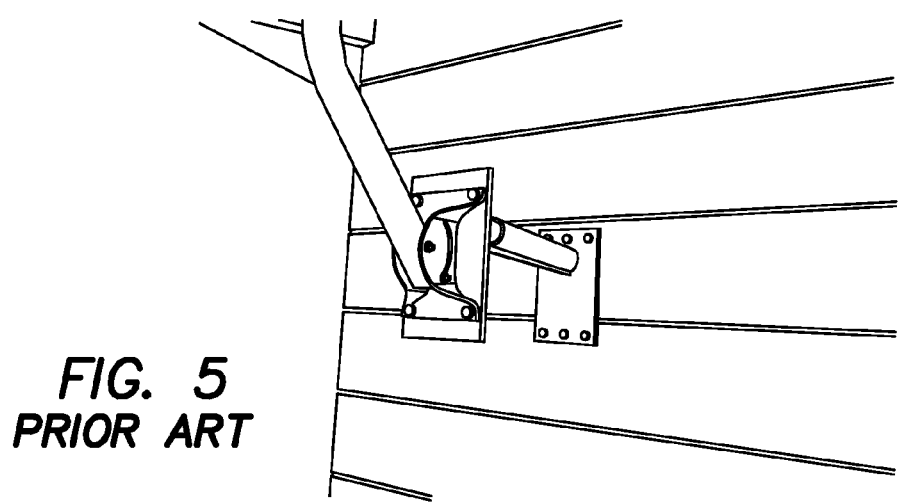
FIG. 5 is an illustration of a fourth, prior art antenna mount as installed.
Figure 6:
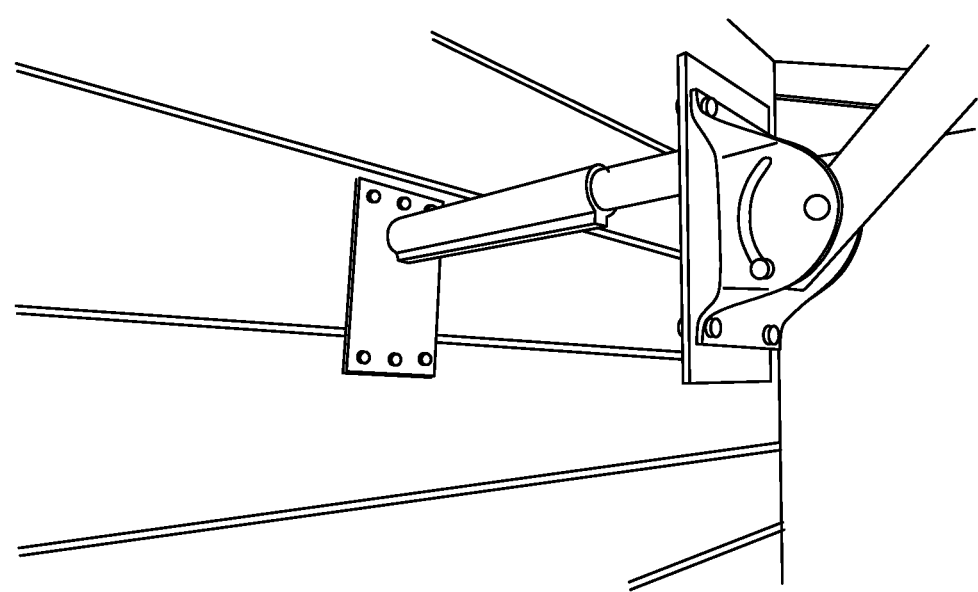
FIG. 6 is another view of the fourth, prior art antenna mount as installed.
Figure 9:
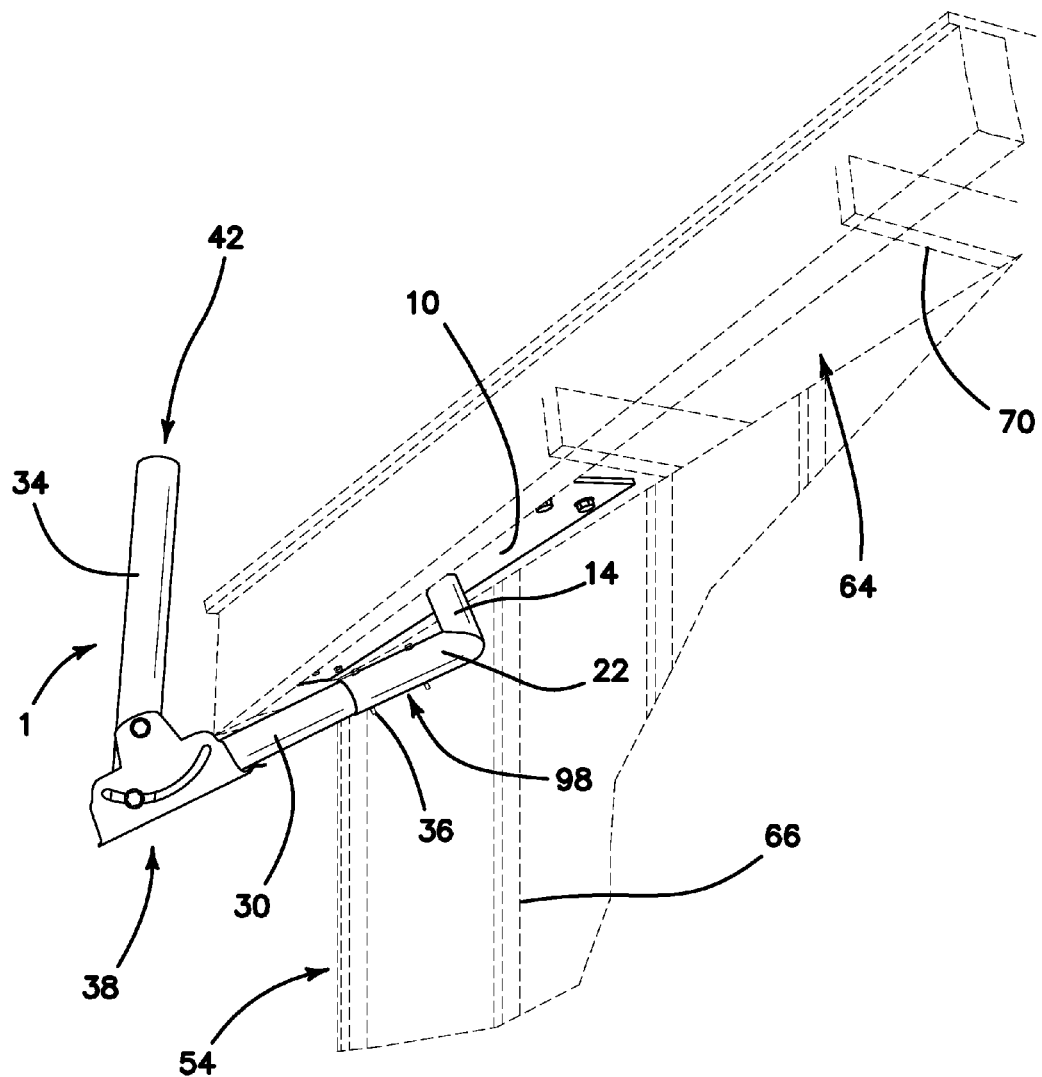
FIG. 9 is a perspective view of the instant invention attached to the roof rafters of a building prior to application of stucco.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIGS. 7, 8, 9, 10 and 11 show the main components of this invention 1:

a base plate 10 designed to be attached under a roof rafter or a to a stud 66 of an exterior wall;

a first leg 14 attached to the base plate 10 by a first attachment 18;

a second leg 22 attached to the first leg 14 by a second attachment 26;

a third leg 30 attached to the second leg 22 by a third attachment 36; and a fourth leg 34 attached to the third leg 30 by a fourth attachment 38.

The free end 42 of the fourth leg 34 is designed so that the antenna 46 can be attached to the free end 42, typically with some sort of clamp 50 that is firmly attached to the antenna 46. Before the clamp 50 is fully secured, since the free end 42 and the clamp 50 are tubular, the clamp 50 and thus the antenna 46 are free to rotate 360°.

The lengths of the legs 14, 22, 30, 34 and the angles of the attachments 18, 26, 38 are selected so that the fourth leg 34 is vertical and the antenna 46 is situated far away enough from the building 54 so that it will clear the building 54 when rotated 360°.

FIGS. 7, 8, 9, 10 and 11 show that the attachments 18, 26 are fixed while attachment 38 is angularly adjustable. Permanent attachments are made by welding, brazing, soldering, adhesive bonding and the like. Preferably the angularly adjustable attachment 38 is a slotted cradle 58 attached to the third 30 or fourth 34 leg, a pivot 62 around which the fourth 34 or second 30 leg can rotate and a fastener 68 to lock the legs 30, 34 in the desired angular relationship. This is a common technique for adjusting the angle between two components. However, those familiar with the art to which this invention pertains will realize that any or all of the attachments 18, 26, 38 may be made permanent or angularly adjustable. In like manner, any or all of the attachments 18, 26, 38 may be made rotationally adjustable, i.e. able to rotate about the long axis of the leg 14, 22, 30, 34. Furthermore, the lengths of the legs 14, 22, 30 34 could be made lengthwise adjustable by known techniques.

Figure 10:
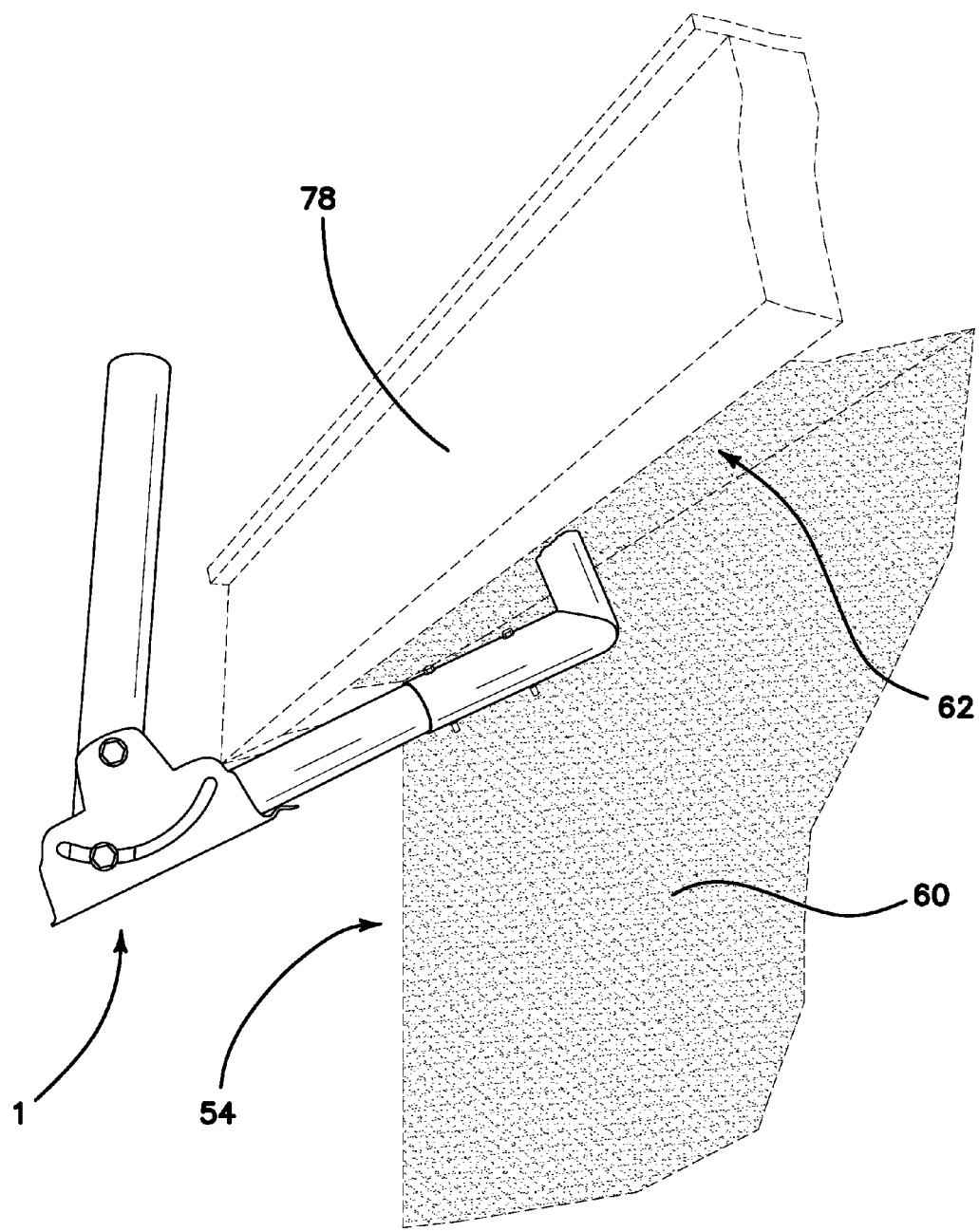
FIG. 10 is a perspective view of the instant invention attached to the roof rafters of a building after application of stucco.
Figure 11:
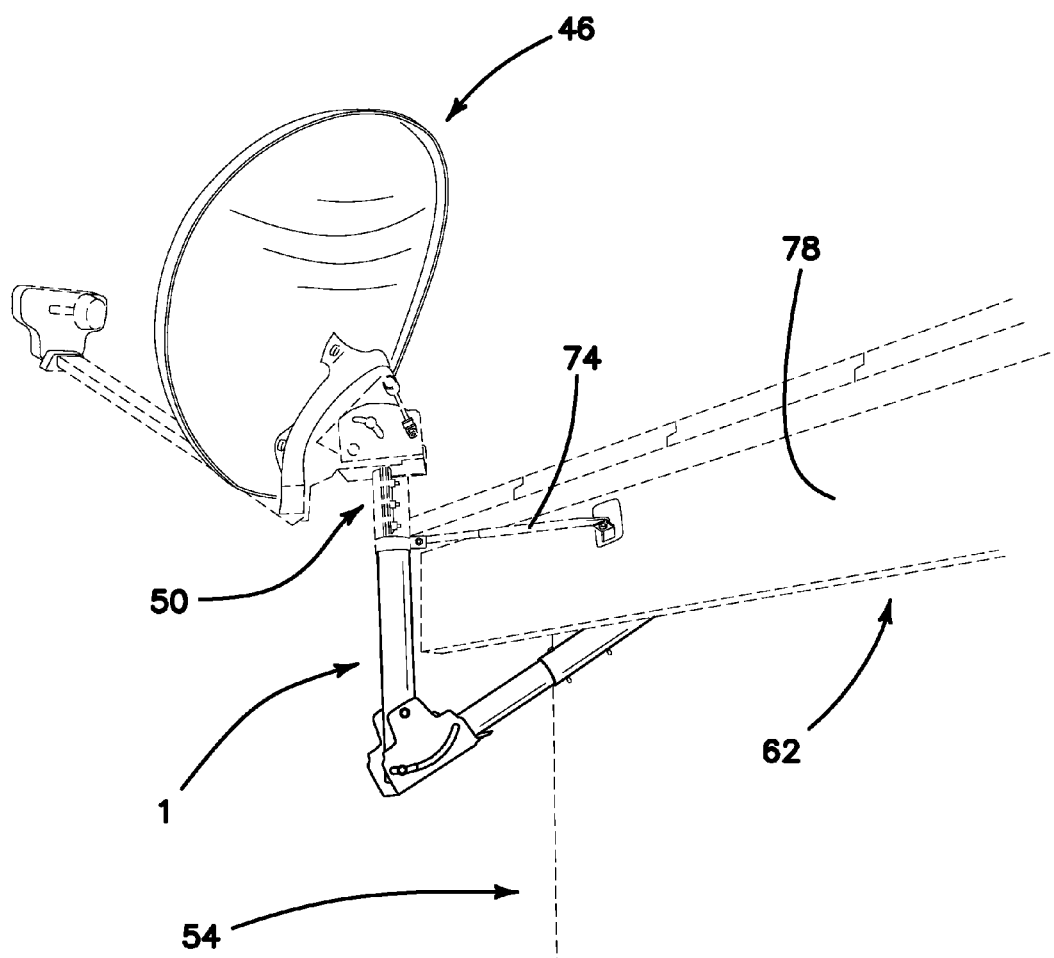
FIG. 11 is a perspective view of the instant invention attached to the roof rafters of a building with the antenna attached.

FIG. 10 shows how the legs 22 and 30 are attached to each other. In the preferred embodiment, they are of different diameters so that one can slide snugly inside the other. Each leg 22, 30 is provided with diagonal holes that are in registration with each other. When one leg 22 or 30 is slid inside the other 30 or 22 and the holes lined up, bolts 36 are inserted through the holes and secured with nuts (not visible). This is a common method of attaching tubular components to each other. Those familiar with the art to which this invention pertains will realize that alternate means could be used to linearly fasten the legs 22, 30 to each other. Legs 22, 30 could also be attached to each other so that they are rotationally adjustable in relation to each other.

Figure 12:
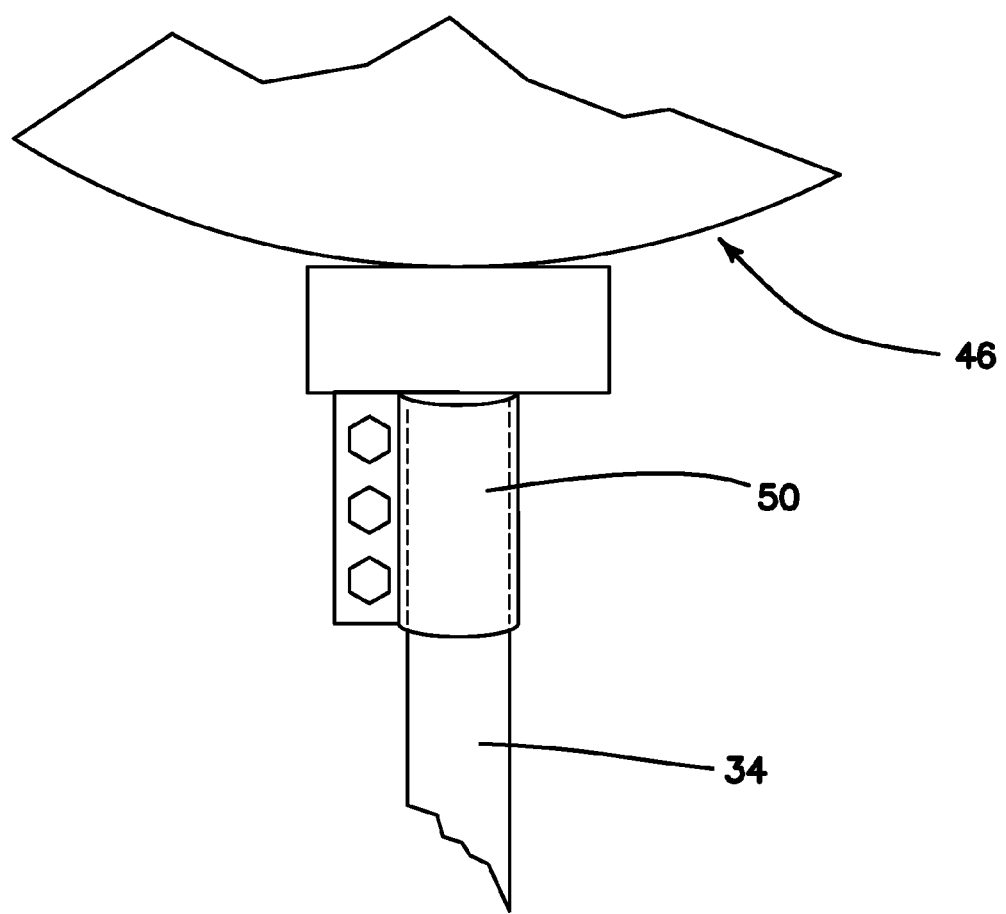
FIG. 12 is an enlarged view of the clamp of the antenna attached to the free end of this invention.
Figure 13:
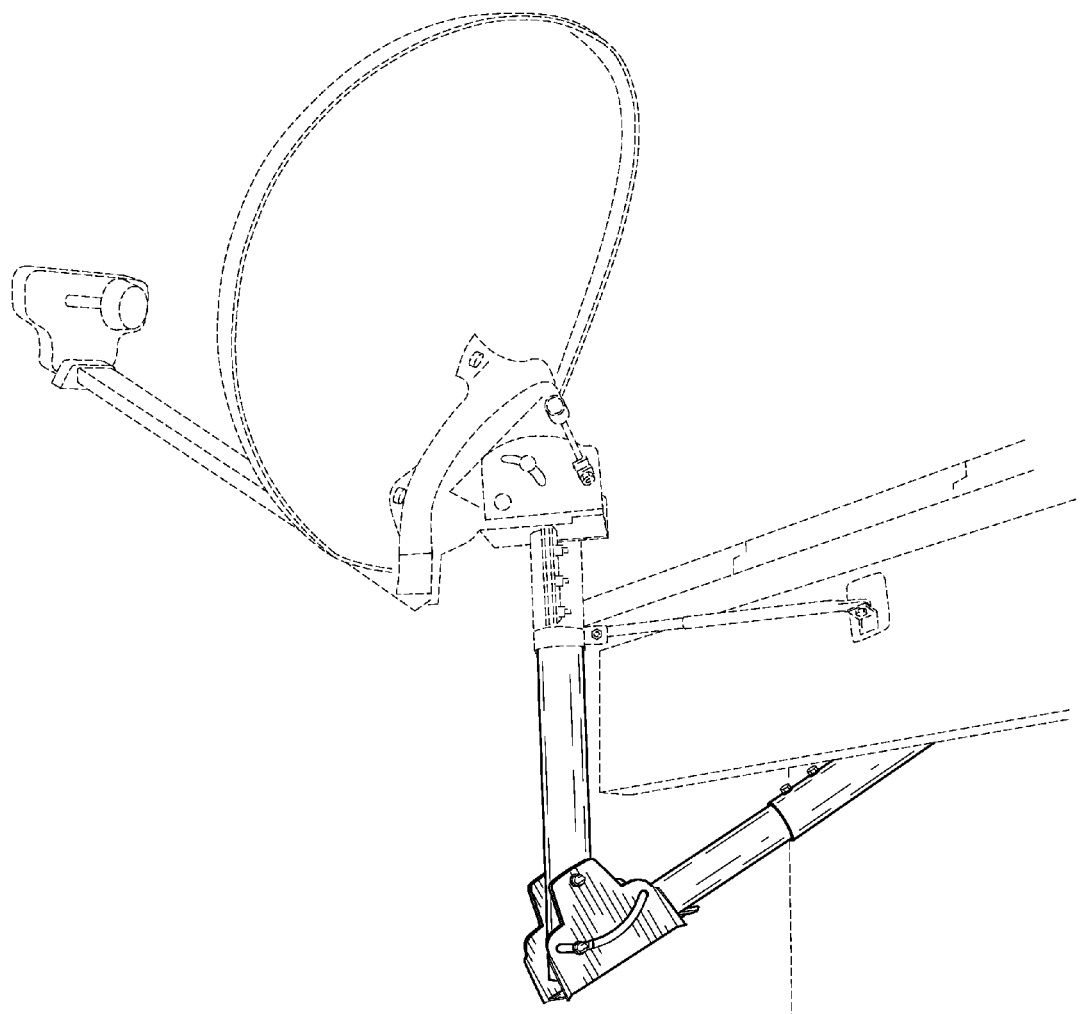
FIG. 13 is a perspective view of the instant invention attached to a building with the antenna attached.
Figure 14:
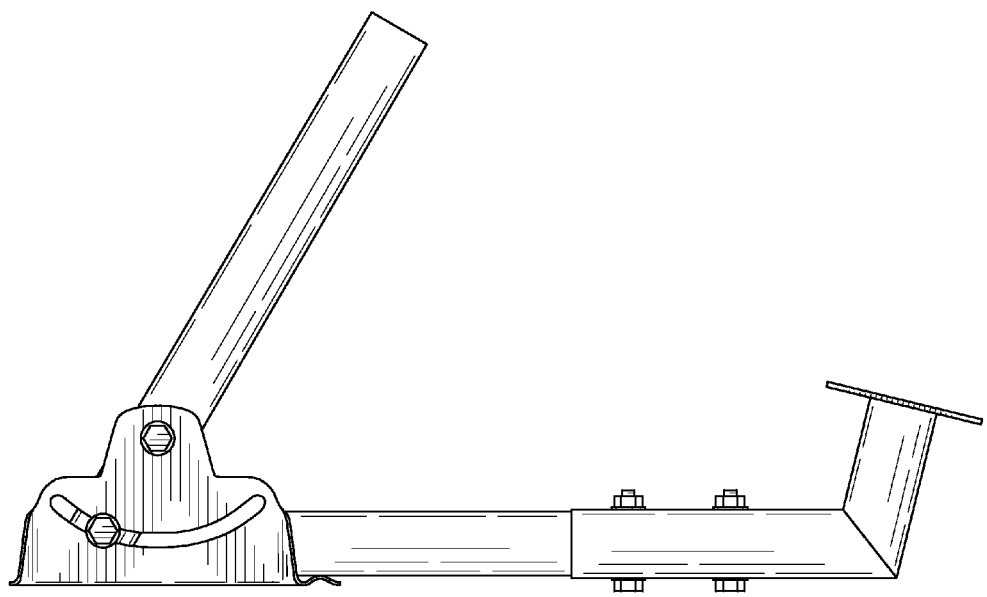
FIG. 14 is a side view of the instant invention from one side.
Figure 15:
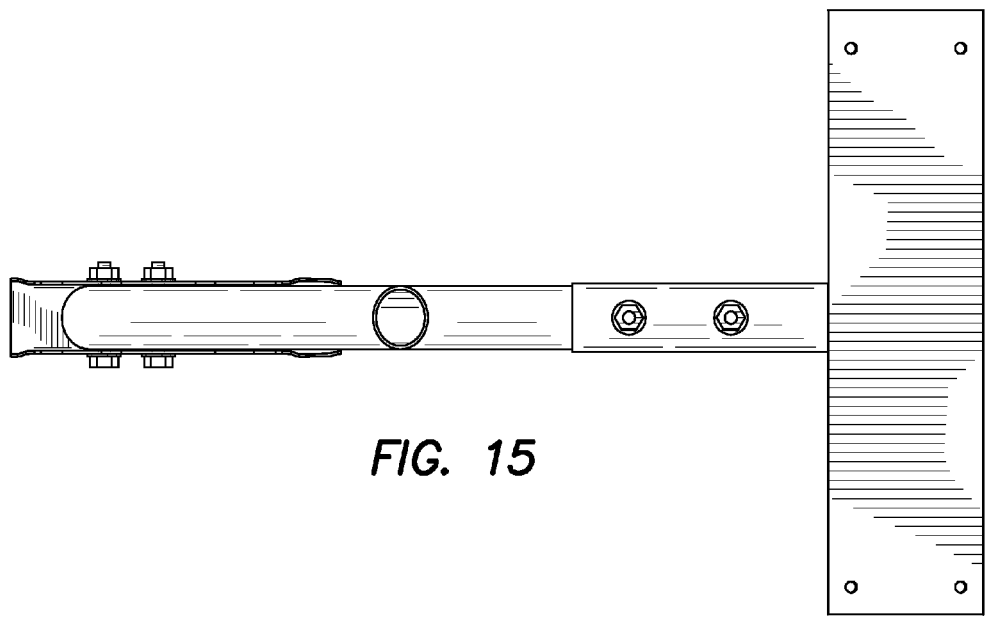
FIG. 15 is a top view of the instant invention.
Figure 16:
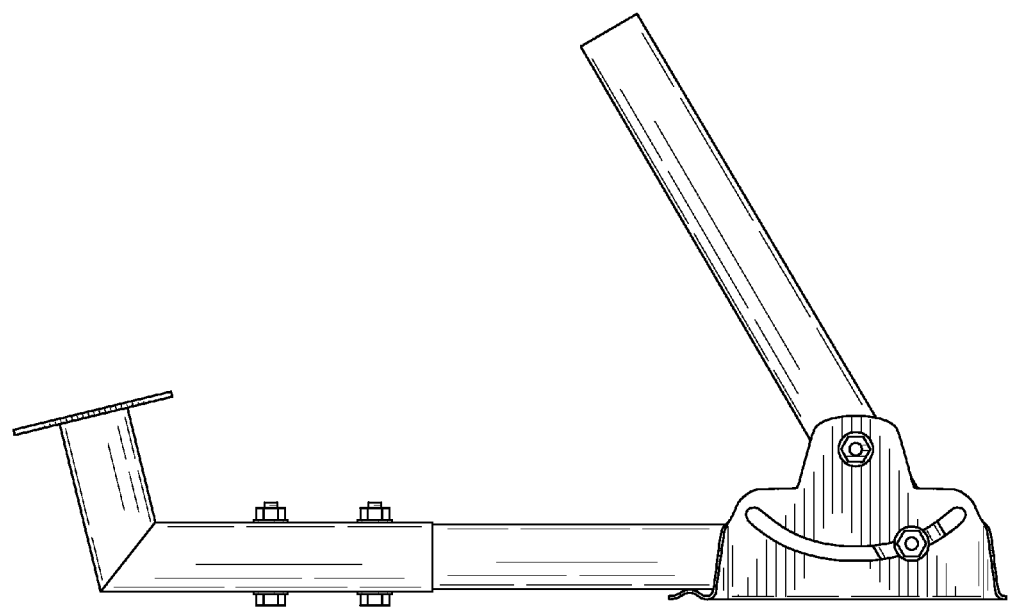
FIG. 16 is a side view of the instant invention from the other side
Figure 17:
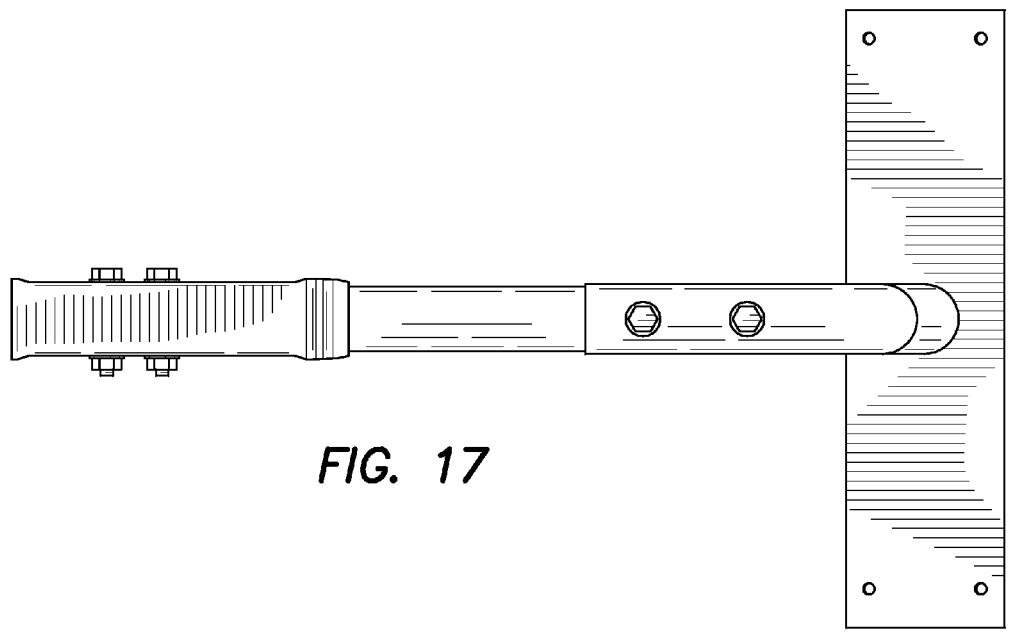
FIG. 17 is a bottom view of the instant invention.
Figure 18:
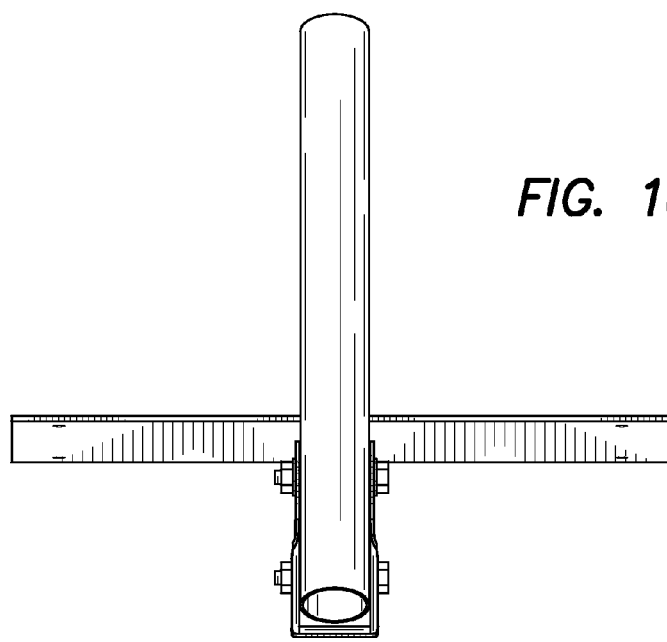
FIG. 18 is an end view of the instant invention from one end.
Figure 19:
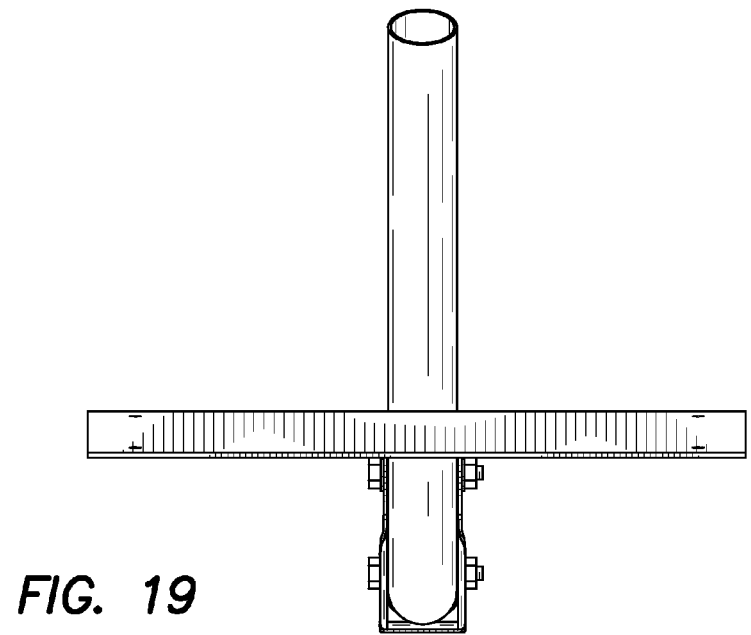
FIG. 19 is an end view of the instant invention from the other end.

In the preferred embodiment of this invention 1, the base plate 10, first leg 14 and second leg 22 are preassembled as shown on FIG. 7. Then the third leg 30, fourth leg 34 and angularly adjustable joint 38 are attached to each other as shown on FIG. 8. Next a location at the building 54 for strongest reception of a broadcast signal is selected and the base plate is fastened to a roof rafter 70 (i.e. under the eaves 64) or a stud 66 of the building 54. Next, the second 22 and third 30 legs are attached to each other and the angularly adjustable joint 30 is adjusted so that the fourth leg 34 is vertical. Finally, as shown in FIG. 12, access the antenna clamp 50, which is attached to the antenna 46, is placed on the free end 42 of the fourth leg 34, the antenna 46 is rotated so that it receives the strongest signal and the clamp 50 is tightened so that the antenna 46 is secured firmly in place.

If desired a strut 74 may be secured between the leg 34 and the fascia 78 of the building 54. The antenna mount 1 of this invention can be installed on the building 54 before or after stucco 60 is applied. Compare FIGS. 9 and 10.

Reduced to its essentials, the antenna mount 1 of this invention comprises: a building attachment section 82 including an accessible end 86; and an antenna support section 88 including a free end 42 and a second accessible end 94. The accessible end 86 and the second accessible end 94 are fastened to each other by an attachment 36.

The free end 42 is designed so that the antenna 46 can be attached to the free end 42, typically with some sort of clamp 50 that is firmly attached to the antenna 46. Before the clamp 50 is fully secured, since the free end 42 and the clamp 50 are tubular, the clamp 50 and thus the antenna 46 are free to rotate 360°.

The building attachment section 82 and the antenna support section 88 are designed so that the free end 42 is vertical and the antenna 46 is situated far away enough from the building 54 so that it will clear the building 54 when rotated 360°.

FIG. 10 shows how the first 86 and second 94 accessible ends are attached to each other. In the preferred embodiment, they are of different diameters so that one can slide snugly inside the other. Each end 86, 94 is provided with diagonal holes that are in registration with each other. When one end 86, 94 is slid inside the other 94, 86 and the holes lined up, bolts 36 are inserted through the holes and secured with nuts. This is a common method of attaching tubular components to each other. Those familiar with the art to which this invention pertains will realize that alternate means could be used to linearly fasten the end 86, 94 to each other. The ends 96, 94 could also be attached to each other so that they are rotationally adjustable in relation to each other.

This invention 1 is primarily intended for mounting under roofing rafters 70 of residences at eaves 64 prior to application of stucco. However, this invention 1 could be installed after stucco had been applied. This invention 1 could also be installed on other types of buildings. Use of this invention 1 in a housing project would allow for uniformity of installations, thus making the neighborhood more aesthetically pleasing.

The following reference numerals are used on FIGS. 1 through 12.

1 antenna mount of this invention
10 base plate
14 first leg
18 first attachment
22 second leg
26 second attachment
30 third leg 34 fourth leg
36 third attachment
36 bolts
38 fourth attachment or angularly adjustable joint
42 free end of fourth leg
46 antenna
50 antenna clamping device or clamp
54 building
58 slotted cradle
60 stucco
62 pivot
64 eaves
66 stud
68 fastener
70 roof rafter
74 strut
78 fascia of the building
82 attachment section
86 accessible end
88 antenna support section
94 second accessible end Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An antenna mount comprising:
   a. a base plate designed to be fastened under and directly to at least two roof rafters or to at least two studs of an exterior wall, prior to the application of stucco, said base plate having a width sufficient to accommodate at least one fastening device and a length sufficient to locate two of said fastening devices on adjacent rafters or studs;
   b. a first leg fastened orthogonally to said base plate by a first attachment;
   c. a second leg fastened to said first leg by a second attachment;
   d. a third leg fastened to said second leg by a third attachment;
   e. a fourth leg fastened to said third leg by a fourth attachment, said fourth attachment being angularly adjustable; said fourth leg having a free end; said free end adapted to receive a clamping device of said antenna;
   said legs and attachments designed so that said fourth leg is vertical and free to rotate 360°, when placed on said free end.

2. An antenna mount as claimed in claim 1 in which at least one of said attachments is permanent.

3. An antenna mount as claimed in claim 1 in which at least one of said attachments is temporary.

4. An antenna mount as claimed in claim 1 in which at least one of said attachments is rotationally adjustable.

5. An antenna mount as claimed in claim 1 in which at least one of said legs is lengthwise adjustable.

* * * * *